Patented Oct. 21, 1947

2,429,535

UNITED STATES PATENT OFFICE 2,429,535

ALKYLAMINOBENZAMIDES

Alexander R. Surrey, Albany, N. Y., assignor to Winthrop Chemical Company, Inc., New York, N. Y., a corporation of New York No Drawing. Application March 21, 1944, Serial No. 527,484

4 Claims. (Cl. 260—558)

This invention relates to p-alkylaminobenzamides and to methods for their preparation.

According to this invention p-aminobenzamide is converted to a p-alkylaminobenzamide by an alkylation procedure either by direct alkylation with one equivalent of an alkylating agent, for example ethyl iodide, methyl sulfate, or ethyl sulfate, or by action of an active carbonyl compound and reduction of the alkylimino group intermediately formed to an alkylamino group. Alternatively, the p-alkylaminobenzamides can also be prepared by ammonolysis of the esters of p-alkylaminobenzoic acids.

The direct alkylation of p-aminobenzamide by means of an alkylating agent such as an alkyl iodide produces not only the monoalkyl derivative, but also the p-dialkylaminobenzamide, the separation of which from the desired product is very difficult by ordinary methods. It has been found that the monoalkyl and the dialkyl derivatives can be separated conveniently by dissolving the mixture in hydrochloric acid, converting the p-alkylaminobenzamide to the acid-insoluble N-nitroso derivative, and decomposing the separated nitroso derivative with alcoholic hydrogen chloride to regenerate the p-alkylaminobenzamide.

The compounds of the present invention are valuable local anesthetic agents, p-n-butylaminobenzamide, for example, being considerably more active when applied as an aqueous solution to rabbit's cornea than is cocaine hydrochloride in the same concentration. The anesthetic power increases with increasing molecular weight of the alkyl group, the ethyl derivative having only relatively slight anesthetic effect, and the higher members having strong effects. The decreasing water solubility as the number of carbon atoms is increased, however, makes it necessary to select an alkyl radical of intermediate molecular weight, that is, one containing from two to ten carbon atoms.

The following examples will serve to illustrate the invention without, however, limiting it thereto.

Example 1

A mixture of 6.8 g. of p-aminobenzamide, 7.8 g. of ethyl iodide, and 5 g. of sodium bicarbonate in 75 cc. of 35% aqueous alcohol is refluxed on a steam bath for eight hours. Most of the solvent is removed by distillation, water is added to the residue, and the insoluble solid is collected on a filter. This solid is dissolved in 70 cc. of dilute hydrochloric acid. The solution is cooled in ice water, and to it is added with stirring a solution of 3 g. of sodium nitrite in 15 cc. of water. The precipitate which forms is collected on a filter. This product, which is p-N-ethyl-N-nitrosoaminobenzamide, weighs 5.5 g. The pure compound melts at approximately 187–188° C.

The product so obtained is treated with charcoal in 180 cc. of hot anhydrous ethyl alcohol and the mixture is filtered. Dry hydrogen chloride is bubbled at a rapid rate into the cooled and well-stirred filtrate until all of the solid dissolves. The clear solution is stirred at room temperature for several hours, treated with charcoal, filtered, and the filtrate is evaporated almost to dryness. Water is added to dissolve the p-ethylaminobenzamide hydrochloride which separates and the solution is made alkaline by addition of ammonium hydroxide. After the solution has stood for a short time, p-ethylaminobenzamide separates. It can be purified by recrystallization from hot water. The pure compound melts at approximately 144–145° C.

Example 2

A mixture of 10.8 g. of p-aminobenzamide, 60 g. of zinc dust, 100 cc. of glacial acetic acid, and 200 cc. of anhydrous ethyl alcohol is refluxed on a steam bath with stirring. Five grams of freshly distilled propionaldehyde in about 20 cc. of anhydrous ethyl alcohol is added over a period of one hour and refluxing is continued for one hour longer. Insoluble matter is removed by filtration and the filtrate is steam distilled to remove ethyl alcohol and acetic acid until the residual liquid has a volume of about 750 cc. On cooling this residue, there separates p-n-propylaminobenzamide. The product may be purified by recrystallization from dilute ethyl alcohol. The pure compound melts at approximately 137–138° C.

If for the propionaldehyde in the above example there is substituted an equivalent amount of butyraldehyde, isobutyraldehyde, n-valeraldehyde, or n-heptaldehyde, there is obtained, respectively, p-n-butylaminobenzamide, p-isobutylaminobenzamide, p-n-amylaminobenzamide, or p-n-heptylaminobenzamide.

What is claimed is:

1. A p-alkylaminobenzamide, having the structural formula

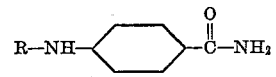

where R represents an alkyl group containing from two to ten carbon atoms.

2. p-n-Butylaminobenzamide, having the structural formula

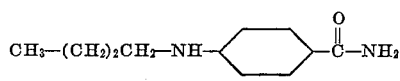

and melting at approximately 111–112° C.

3. p-n-Amylaminobenzamide, having the structural formula

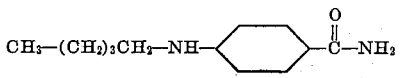

4. p-n-Propylaminobenzamide, having the structural formula

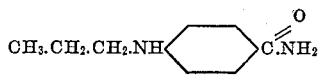

and melting at approximately 137–138° C.

ALEXANDER R. SURREY.

REFERENCES CITED

The following references are of record in the file of this patent:

UNITED STATES PATENTS

| Number | Name | Date |
|---|---|---|
| 2,045,574 | Adkins | June 30, 1936 |
| 2,223,303 | Lazier | Nov. 26, 1940 |
| 2,298,284 | Emerson | Oct. 13, 1942 |

FOREIGN PATENTS

| Number | Country | Date |
|---|---|---|
| 77,329 | Germany | Sept. 21, 1894 |

OTHER REFERENCES

Wenker, "Jour. Am. Chem. Soc." vol. 60, p. 1081 (1938).

Carronna, "Gazzeta Chimica Italiana," vol. 71, pp. 475–480.

Feldmann et al., "Jour. of Org. Chem.," vol. 7, pp. 31–47 (1942).

Folin, "American Chemical Journal," vol. 19, (1897), p. 330.

Houben, "Ber. Deut. Chem.," vol. 42, pp. 4822–4823 (1909).